(12) United States Patent
Guo et al.

(10) Patent No.: US 11,997,743 B2
(45) Date of Patent: May 28, 2024

(54) STATE SWITCHING METHOD, APPARATUS, DEVICE, AND STORAGE MEDIUM

(71) Applicant: GUANGDONG OPPO MOBILE TELECOMMUNICATIONS CORP., LTD., Dongguan (CN)

(72) Inventors: Yali Guo, Dongguan (CN); Qianxi Lu, Dongguan (CN); Haorui Yang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/206,199

(22) Filed: Jun. 6, 2023

(65) Prior Publication Data

US 2023/0319945 A1 Oct. 5, 2023

Related U.S. Application Data

(63) Continuation of application No. PCT/CN2021/075519, filed on Feb. 5, 2021.

(51) Int. Cl.
*H04W 76/27* (2018.01)
*H04W 76/30* (2018.01)
*H04W 88/04* (2009.01)

(52) U.S. Cl.
CPC ........... *H04W 76/27* (2018.02); *H04W 76/30* (2018.02); *H04W 88/04* (2013.01)

(58) Field of Classification Search
CPC ...... H04W 76/27; H04W 76/30; H04W 88/04
See application file for complete search history.

(56) References Cited

U.S. PATENT DOCUMENTS

| 11,419,025 | B2 * | 8/2022 | Xu | .......... | H04W 76/30 |
| 2013/0122892 | A1 * | 5/2013 | Morioka | .......... | H04W 76/30 |
| | | | | | 455/422.1 |

(Continued)

FOREIGN PATENT DOCUMENTS

| CN | 102378329 A | 3/2012 |
| CN | 103748937 A | 4/2014 |

(Continued)

OTHER PUBLICATIONS

International Search Report issued in international application No. PCT/CN2021/075519, mailed Nov. 15, 2021.

(Continued)

*Primary Examiner* — Will W Lin
(74) *Attorney, Agent, or Firm* — BAYES PLLC (57) ABSTRACT

The present application relates to the field of mobile communications, and discloses a state transition method, apparatus, a device, and a storage medium. The state transition method is applied to a relay terminal, the relay terminal is connected to an access network device, the relay terminal is connected to at least one communication terminal, and the communication terminal is connected to the access network device through the relay terminal, the method includes: receiving a first control message sent by the access network device, where the first control message is sent by the access network device in a case of determining that all communication terminals connected to the access network device through the relay terminal have left a connection state with the access network device; based on the first control message, leaving a connection state with the access network device.

14 Claims, 5 Drawing Sheets

(56) References Cited

U.S. PATENT DOCUMENTS

| | | |
|---|---|---|
| 2017/0208640 A1 | 7/2017 | Kim et al. |
| 2018/0092022 A1 | 3/2018 | Huang et al. |
| 2018/0176914 A1 | 6/2018 | Hagihara |
| 2018/0213588 A1* | 7/2018 | Wei ................... H04W 48/08 |
| 2019/0014614 A1* | 1/2019 | Chang ................ H04W 76/19 |
| 2019/0141515 A1* | 5/2019 | Kim ................ H04W 36/0022 |
| 2020/0214071 A1* | 7/2020 | Xu .................... H04L 45/123 |
| 2020/0229049 A1* | 7/2020 | Wu ..................... H04W 76/12 |
| 2020/0260283 A1* | 8/2020 | Hu ........................... H04L 9/14 |
| 2021/0204348 A1* | 7/2021 | Chen ................. H04W 76/19 |
| 2022/0174762 A1* | 6/2022 | Pan .................... H04W 76/27 |
| 2022/0182972 A1* | 6/2022 | Pan .................... H04W 68/02 |
| 2022/0210847 A1* | 6/2022 | Pan .................... H04W 76/12 |
| 2022/0338283 A1* | 10/2022 | Wang ................ H04W 48/10 |
| 2022/0394592 A1* | 12/2022 | Chen ................. H04W 40/246 |
| 2023/0040140 A1* | 2/2023 | Park .................... H04W 8/245 |
| 2023/0082507 A1* | 3/2023 | Mcmenamy .......... H04W 72/20 370/315 |
| 2023/0156830 A1* | 5/2023 | Wang ................ H04W 76/10 370/328 |
| 2023/0180178 A1* | 6/2023 | Yang .................... H04W 76/14 455/458 |
| 2023/0189054 A1* | 6/2023 | Xing ................ H04W 28/0257 370/229 |

FOREIGN PATENT DOCUMENTS

| | | |
|---|---|---|
| CN | 106341877 A | 1/2017 |
| CN | 109951890 A | 6/2019 |
| WO | 2020144010 A1 | 7/2020 |

OTHER PUBLICATIONS

Written Opinion of the International Searching Authority issued in international application No. PCT/CN2021/075519, mailed Nov. 15, 2021.

3GPP TR 23.752 V1.0.0 (Nov. 2020); Technical Specification Group Services and System Aspects; Study on system enhancement for Proximity based Services (ProSe) in the 5G System (5GS) (Release 17).

Extended European Search Report issued in corresponding European application No. 21923769.0, mailed Dec. 18, 2023.

* cited by examiner

STATE SWITCHING METHOD, APPARATUS, DEVICE, AND STORAGE MEDIUM

CROSS-REFERENCE TO RELATED APPLICATION

This application is a continuation of International Application No. PCT/CN2021/075519, filed Feb. 5, 2021, the entire contents of which are incorporated herein by reference.

TECHNICAL FIELD

The present application relates to the field of mobile communications, and in particular, to a state transition method, apparatus, device, and storage medium.

BACKGROUND

With the rapid development of mobile communication technology and the wide application of terminals, a communication manner in which the terminal is a medium has been proposed. Any terminal may be connected to the core network by using another terminal as a medium so as to communicate with the core network.

Taking the communication terminal and the relay terminal as an example, the communication terminal establishes a connection with the relay terminal, and the relay terminal establishes a connection with the core network to which the relay terminal belongs through the access network device. At this time, the relay terminal transitions to a Connection Management (CM)-connected state. Then, the communication terminal is connected to the access network device by using the relay terminal as the medium, and then connected to the core network to which the communication terminal belongs through the access network device. The communication terminal also transitions to the CM-connected state, and then communicates with the core network to which the communication terminal belongs.

However, if the communication terminal does not need to communicate anymore, it may transition to the CM-idle state or the radio resource control inactive state, while the state of the relay terminal remains unchanged and remains in the CM-connected state, resulting in the resource of the relay terminal being in the consumption state, and thus the resource utilization is low.

SUMMARY

Embodiments of the present application provide a state transition method, apparatus, device, and storage medium, which prevent the relay terminal from being still in the connection state with the access network device in the case that the communication terminal connected to the access network device through the relay terminal leaves the connection state with the access network device, which saves the resource consumption of the relay terminal, thereby improving the communication quality of the relay terminal. The technical solutions are as follows.

According to an aspect of the present application, a state transition method is provided, which is applied to an access network device, a relay terminal is connected to the access network device, the relay terminal is connected to at least one communication terminal, and the communication terminal is connected to the access network device through the relay terminal, and the method includes:
controlling the at least one communication terminal to leave a connection state with the access network device;
in a case of determining that all communication terminals connected to the access network device through the relay terminal have left the connection state with the access network device, sending a first control message to the relay terminal, where the first control message is used for instructing the relay terminal to leave a connection state with the access network device.

According to an aspect of the present application, a state transition method is provided, which is applied to a relay terminal, the relay terminal is connected to an access network device, the relay terminal is connected to at least one communication terminal, and the communication terminal is connected to the access network device through the relay terminal, the method includes:
receiving a first control message sent by the access network device, where the first control message is sent by the access network device in a case of determining that all communication terminals connected to the access network device through the relay terminal have left a connection state with the access network device;
based on the first control message, leaving a connection state with the access network device.

According to an aspect of the present application, a state transition apparatus is provided, which is applied to an access network device, a relay terminal is connected to the access network device, the relay terminal is connected to at least one communication terminal, and the communication terminal is connected to the access network device through the relay terminal, and the apparatus includes:
a control module, configured to control the at least one communication terminal to leave a connection state with the access network device;
a sending module, configured to, in a case of determining that all communication terminals connected to the access network device through the relay terminal have left the connection state with the access network device, send a first control message to the relay terminal, where the first control message is used for instructing the relay terminal to leave a connection state with the access network device.

According to an aspect of the present application, a state transition apparatus is provided, which is applied to a relay terminal, the relay terminal is connected to an access network device, the relay terminal is connected to at least one communication terminal, and the communication terminal is connected to the access network device through the relay terminal, and the apparatus includes:
a control module, configured to control the at least one communication terminal to leave a connection state with the access network device;
a sending module, configured to, in a case of determining that all communication terminals connected to the access network device through the relay terminal have left the connection state with the access network device, send a first control message to the relay terminal, where the first control message is used for instructing the relay terminal to leave a connection state with the access network device.

According to an aspect of the present application, an access network device is provided, the access network device including: a processor; a transceiver connected to the processor; a memory for storing an executable program code of the processor; where the processor is configured to load and execute the executable program code to implement the state transition method as described in the above aspects.

According to an aspect of the present application, a relay terminal is provided, the relay terminal including: a processor; a transceiver connected to the processor; a memory for storing executable instructions of the processor; where the processor is configured to load and execute the executable instructions to implement the state transition method as described in the above aspects.

According to an aspect of the present application, a computer-readable storage medium is provided, an executable program code is stored in the readable storage medium, and the executable program code is loaded and executed by a processor to implement the state transition method as described in the above aspects.

According to an aspect of the present application, a chip is provided, the chip includes a programmable logic circuit and/or program instructions, and when the chip runs on an access network device or a relay terminal, it is configured to implement the state transition method as described in the above aspects.

According to an aspect of the present application, an embodiment of the present application provides a computer program product, which is configured to implement the state transition method as described in the above aspects when the computer program product is executed by a processor of an access network device or a relay terminal.

The technical solutions provided by the embodiments of the present application include at least the following beneficial effects.

In the method, apparatus, device, and storage medium provided by the embodiments of the present application, the access network device can control the relay terminal to leave the connection state with the access network device when it is determined that at least one communication terminal connected to the relay terminal has left the connection state with the access network device, which prevents the relay terminal from being still in the connection state with the access network device when the communication terminal connected to the access network device through the relay terminal leaves the connection state of the access network device, thus the resource consumption of the relay terminal is saved, and the communication quality of the relay terminal is improved.

BRIEF DESCRIPTION OF THE DRAWINGS

In order to illustrate the technical solutions in the embodiments of the present application more clearly, the following briefly introduces the drawings that are used in the description of the embodiments. Obviously, the drawings in the following description are only some embodiments of the present application. For those of ordinary skill in the art, other drawings can also be obtained from these drawings without creative effort.

DETAILED DESCRIPTION

In order to make the objectives, technical solutions and advantages of the present application clearer, the embodiments of the present application will be further described in detail below with reference to the accompanying drawings.

First, the terms involved in the embodiments of the present application are explained.

Figure 1:
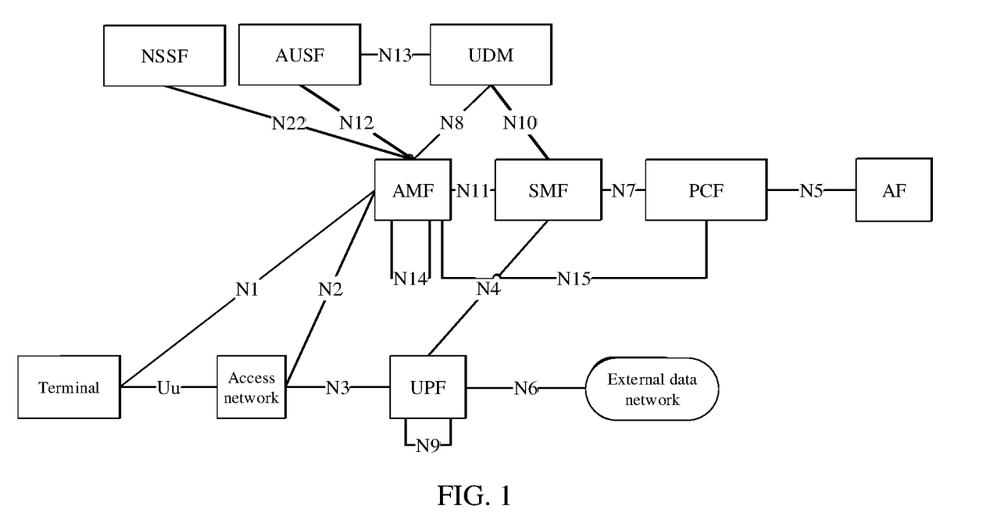
FIG. 1 shows a schematic structural diagram of a network structure provided by an exemplary embodiment of the present application.

Network system architecture: in the embodiments of the present application, the network system architecture is shown in FIG. 1, and the network system architecture includes a terminal, an access network, a User Plane Function (UPF) network element, an external data network, an Access Management Function (AMF) network element, a Session Management Function (SMF) network element, a Policy Control function (PCF) network element, an Application Function (AF) network element, a Network SliceSelection Function (NSSF) network element, an Authentication Server Function (AUSF) network element, and a Unified Data Management (UDM) network element. The terminal is connected with the access network at the access layer through Uu (a communication interface) interface, and then exchanges the access layer messages and performs the wireless data transmission. The terminal is connected with the AMF network element at the access layer through N1 (a communication interface) interface, and then exchanges the Non-access stratum (None Access Stratum) messages. Among them, the AMF network element has the mobility management function in the core network, and the SMF has the session management function in the core network. In addition to the mobility management of the terminal, the AMF network element is also responsible for forwarding the session management message between the terminal and the SMF network element, and the AMF network element exchanges data with the SMF network element through the N11 (a communication interface) interface. The PCF network element has a policy management function in the core network, is responsible for formulating policies related to the mobility management, session management, and charging of the terminal, and exchanges data with the SMF network element through the N7 (a communication interface) interface. In addition, the PCF network element exchanges data with the AMF through the N15 (a communication interface) interface. The UPF network element has the user plane function in the core network, performs data transmission with the external data network through the N6 (a communication interface) interface, and performs data transmission with the access network through the N3 (a communication interface) interface. After the terminal accesses the mobile communication network through the Uu port, a PDU session is established for data transmission under the control of the SMF network element. The NSSF network element exchanges data with the AMF network element through the N22 (a communication interface) interface. The AUSF network element exchanges data with the AMF network element through the N12 (a communication interface) interface, and exchanges data with the UDM network element through the N13 (a communication interface) interface. The UDM network element performs data interaction with the AMF network element through the N8 (a communication interface) interface, and performs data interaction with the SMF network element through the N10 (a communication interface) interface.

State of the terminal: there are two connection management states between the terminal that has been registered to the network and the AMF: idle state or connected state. If the connection between the terminal and the access network device is established, the access network device establishes a connection with the AMF, so that the terminal can exchange NAS messages with the AMF. At this time, the terminal is in the CM-connected state, and the AMF also marks the state of the terminal as CM-connected state. If the connection between the terminal and the access network device is released, the terminal enters the CM-idle state, the connection between the access network device and the AMF is also released, and the AMF also marks the state of the terminal as the CM-idle state. When the connection between the terminal and the access network device is suspended, and the terminal is in the inactive state of the wireless connection in the CM-connected state, the connection between the access network device and the AMF continues to be maintained, and the AMF still marks the UE state as the CM-connected state.

Figure 2:
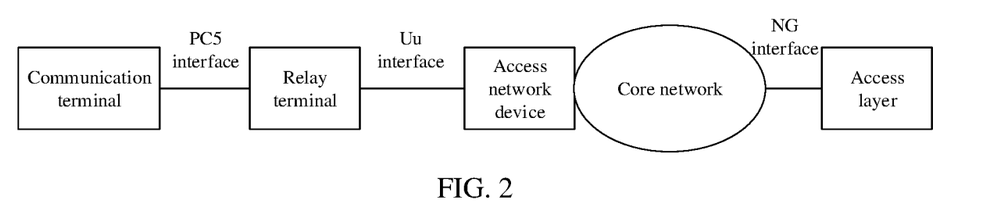
FIG. 2 shows a block diagram of a communication terminal performing communication through a relay terminal according to an exemplary embodiment of the present application.

Relay terminal and communication terminal: in the embodiments of the present application, the relay terminal and the communication terminal are terminals with Proximity Services (Prose) capability, and the relay terminal and the communication terminal can establish a connection and communicate through the PC5 interface. Moreover, as shown in FIG. 2, the relay terminal can not only connect to the access network device through the mobile communication network, but also can be used as a relay terminal. After the communication terminal establishes a connection with the relay terminal through the PC5 interface, the relay terminal establishes a connection with the access network device through the Uu interface, and then the communication terminal is connected with the access network device by using the relay terminal as the medium, and then conducts data interaction with the core network to which the communication terminal belongs. In addition, the communication terminal exchanges messages with the access layer through NG (a communication interface) interface.

Figure 3:
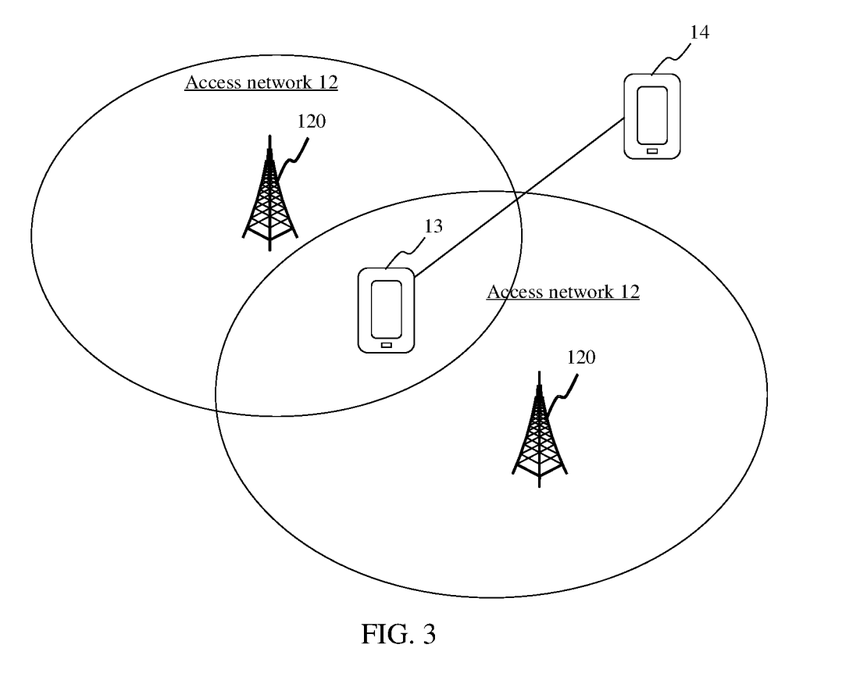
FIG. 3 shows a block diagram of a communication system provided by an exemplary embodiment of the present application.

FIG. 3 shows a block diagram of a communication system provided by an exemplary embodiment of the present application. The communication system may include: an access network 12, a relay terminal 13 and a communication terminal 14.

The access network 12 includes several network devices 120. The network device 120 may be a base station, which is an apparatus deployed in an access network to provide a wireless communication function for a terminal. The base station may include various forms of macro base station, micro base station, relay station, access point and so on. In systems using different radio access technologies, the names of devices with base station functions may be different. For example, in LTE systems, they are called eNodeBs or eNBs; in 5G NR-U systems, they are called gNodeBs or gNBs. As communication technology evolves, the description of "base station" may change. For the convenience of the embodiments of the present application, the above-mentioned apparatuses for providing wireless communication functions for the relay terminal 13 are collectively referred to as the access network device.

The relay terminal 13 and the communication terminal 14 may include various handheld devices, vehicle-mounted devices, wearable devices, computing devices or other processing devices connected to wireless modems with wireless communication capabilities, as well as various forms of user equipment, Mobile Station (MS), terminal (terminal device) and so on. For the convenience of description, the devices mentioned above are collectively referred to as terminals. The access network device 120 and the relay terminal 13 communicate with each other through a certain air interface technology, such as a Uu interface, and the relay terminal 13 and the communication terminal 14 are connected through short-range communication.

The technical solutions of the embodiments of the present application can be applied to various communication systems, such as: a Global System of Mobile communication (GSM) system, a Code Division Multiple Access (CDMA) system, a Wideband Code Division Multiple Access (WCDMA) system, General Packet Radio Service (GPRS), a Long Term Evolution (LTE) system, an LTE Frequency Division Duplex (FDD) system, an LTE Time Division Duplex (TDD) system, an Advanced long term evolution (LTE-A) system, a New Radio (NR) system, an evolution system of NR system, an LTE-based access to unlicensed spectrum (LTE-U) system, a NR-U system, a Universal Mobile Telecommunication System (UMTS), a Worldwide Interoperability for Microwave Access (WiMAX) communication system, Wireless Local Area Networks (WLAN), Wireless Fidelity (WiFi), a next-generation communication system or other communication systems, etc.

Generally speaking, traditional communication systems support a limited number of connections, which are easy to be implemented. However, with the development of communication technology, the mobile communication systems will not only support traditional communication, but also support, for example, Device to Device (D2D) communication, Machine to Machine (M2M) communication, Machine Type Communication (MTC), Vehicle to Vehicle (V2V) communication and Vehicle to Everything (V2X) system, etc. The embodiments of the present application can also be applied to these communication systems.

Figure 4:
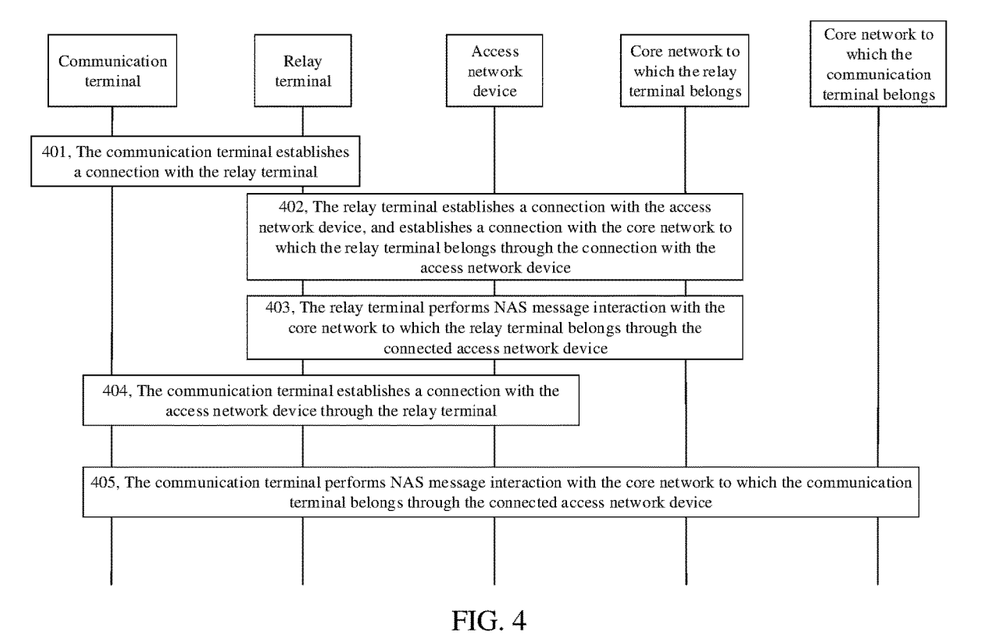
FIG. 4 shows a flowchart of a communication method provided by an exemplary embodiment of the present application.

The process of connecting a communication terminal to an access network device through a relay terminal will be described first. For example, FIG. 4 shows a flowchart of a communication method provided by an exemplary embodiment of the present application, which is applied to the communication terminal, the relay terminal, and the access network device described in FIG. 1, and the method includes at least part of the following contents.

In 401, the communication terminal establishes a connection with the relay terminal.

In the embodiments of the present application, both the communication terminal and the relay terminal have short-range communication capabilities. If the communication terminal and the relay terminal are located within the short-range communication range, the communication terminal and the relay terminal establish a short-range communication connection.

In some embodiments, the relay terminal has a short-range communication capability, and continuously sends a broadcast message, where the broadcast message is used to indicate that the relay terminal can provide a relay service for connection of other terminals. If the communication terminal needs to perform data transmission, and the communication terminal cannot currently connect to the access network device, and it scans and obtains the broadcast message sent by the relay terminal, then the communication terminal sends a connection request message to the relay terminal, and the relay terminal establishes a short-range communication connection with the communication terminal based on the connection request message.

The communication terminal establishes a short-range communication connection with the relay terminal through a PC5 (a communication interface) interface.

In 402, the relay terminal establishes a connection with the access network device, and establishes a connection with the core network to which the relay terminal belongs through the connection with the access network device.

In the embodiments of the present application, after the relay terminal and the communication terminal establish a short-range communication connection, the communication terminal can trigger the establishment of a connection between the relay terminal and the access network device, and then establish a connection with the core network to which the relay terminal belongs based on the connection with the access network device.

The relay terminal is located in the broadcast range of the access network device, and the relay terminal has established a short-range communication connection with the communication terminal, then the relay terminal sends a connection establishment request to the access network device, and then the access network device establishes a connection with the relay terminal based on the connection establishment request. Moreover, after the relay terminal establishes the connection with the access network device, the relay terminal can also establish a connection with the core network to which the relay terminal belongs through the connection with the access network device.

In some embodiments, the core network is an AMF network element, or other network elements, which are not limited in the embodiments of the present application.

It should be noted that after the relay terminal establishes a connection with the core network to which the relay terminal belongs, the relay terminal enters the CM-connected state.

In 403, the relay terminal performs NAS message interaction with the core network to which the relay terminal belongs through the connected access network device.

In 404, the communication terminal establishes a connection with the access network device through the relay terminal.

In the embodiments of the present application, after the communication terminal and the relay terminal establish a short-range communication connection through step 201, the relay terminal can perform the forwarding service, and the communication terminal establishes a connection with the access network device through the short-range communication with the relay terminal.

The relay device is a forwarding device. After receiving the communication message sent by the communication terminal, the relay terminal directly sends the communication message to the connected access network device. In fact, the relay terminal is a device used for transparent transmission, and the connection between the communication terminal and the access network device is realized by using the relay terminal as a medium.

It should be noted that, in the embodiments of the present application, description is given by using an example in which 401 is executed before 402-403 and 402-403 are executed before step 404. In another embodiment, 401 can also be executed after 402-403, and 404 can be executed before 402-403, or they can also be executed in other order. The present application does not limit the sequential execution order of 401, 402-403, and 404.

In 405, the communication terminal performs NAS message interaction with the core network to which the communication terminal belongs through the connected access network device.

In the embodiments of the present application, after the communication terminal is connected to the access network device through the relay terminal, the communication terminal can establish a connection with the core network to which the communication terminal belongs based on the connection with the access network device, and then the communication device can perform NAS message interaction with the core network to which the communication terminal.

The core network to which the communication terminal belongs is an AMF network element, or other network elements, which are not limited in the embodiments of the present application.

It should be noted that after the relay terminal establishes a connection with the core network to which the relay terminal belongs, the relay terminal enters the CM-connected state.

In the communication method provided by the embodiments of the present application, the relay terminal is used as a medium, so that the communication terminal is connected to the access network device via the relay terminal, and then the communication terminal performs NAS message exchange with the core network to which the communication terminal belongs based on the connection with the access network device. The relay terminal expands the coverage of the access network device, and improves the efficiency of connecting the communication terminal and the access network device to realize communication.

Figure 5:
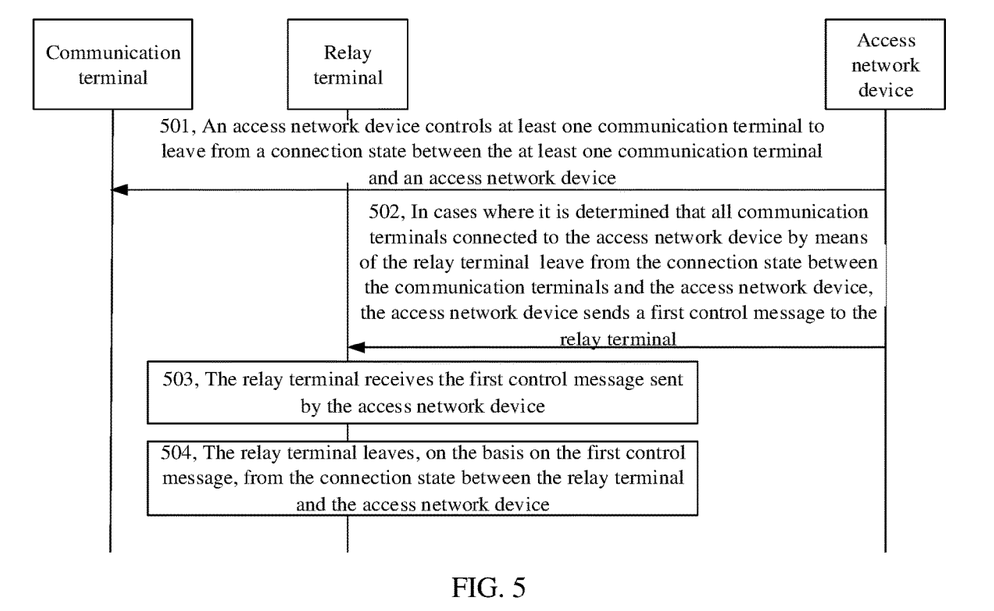
FIG. 5 shows a flowchart of a state transition method provided by an exemplary embodiment of the present application.

The embodiment of FIG. 4 shows a process in which a communication terminal establishes a connection with a core network to which the communication terminal belongs through a relay terminal, thereby implementing communication. The communication terminal may leave the connection state with the access network device, and the access network device may control the state of the relay terminal based on the state of the communication terminal. For the specific process, FIG. 5 may be referred to. In addition, the embodiment in FIG. 4 and the embodiment in FIG. 5 in the present application may be independent embodiments from each other, or the embodiment in FIG. 4 and the embodiment in FIG. 5 may be combined. FIG. 5 shows a flowchart of a state transition method provided by an exemplary embodiment of the present application, which is applied to the communication terminal, the relay terminal, and the access network device as shown in FIG. 1, where the relay terminal is connected to the access network device, the relay terminal is connected with at least one communication terminal, and the communication terminal is connected with the access network device through the relay terminal, and the method includes at least part of the following contents.

In 501, the access network device controls at least one communication terminal to leave a connection state with the access network device.

In the embodiments of the present application, the access network device is connected to at least one communication terminal, and each communication terminal can communicate with the core network to which the communication terminal belongs based on the access network device. If the communication device does not have ongoing service, the communication terminal needs to leave the connection state with the access network device, and the access network device controls the communication terminal to leave the connection state with the access network device.

The communication terminal is currently in a connection state with the access network device, and the connection state is a CM-connected state.

In the embodiments of the present application, the communication terminal leaving the connection state with the access network device includes two cases. The first case is that the communication terminal releases the wireless connection with the access network device and transitions to the CM-idle state. The second case is that the communication terminal suspends the wireless connection with the access network device, and switches to the inactive state of the radio resource control.

For the first case: the access network device sends a second wireless connection releasing message to at least one communication terminal.

The second wireless connection releasing message is used for instructing the communication terminal to transition to the CM-idle state.

Since the access network device needs to control at least one connected communication terminal to leave the connection state with the access network device, the access network device sends a second wireless connection releasing message to the at least one communication terminal, and after the communication terminal receives the second wireless connection releasing message sent by the access network device, it transitions to the CM-idle state based on the second wireless connection releasing message, and at this time, the communication terminal no longer communicates with the access network device.

For the second case: a second wireless connection suspension message is sent to at least one communication terminal.

The second wireless connection suspension message is used for instructing the communication terminal to switch to the radio resource control inactive state.

Because the access network device needs to control at least one connected communication terminal to leave the connection state with the access network device, the access network device sends a second wireless connection suspension message to the at least one communication terminal, and after receiving the second wireless connection suspension message sent by the access network device, the communication terminal is switched to the radio resource control inactive state based on the second wireless connection releasing message, and at this time, the communication terminal no longer communicates with the access network device.

It should be noted that, the embodiments of the present application are described by taking the relay terminal and the access network device in a connected state as an example. In another embodiment, the relay terminal needs to connect with the access network device first, the relay terminal determines that it needs to establish a connection with the access network device through the wireless connection with the communication terminal, and sends the connection establishment request to the access network device, the access network device accesses the connection establishment request sent by the relay terminal through the connection with the communication terminal, and then establishes a wireless connection with the relay terminal.

In 502, in a case where it is determined that all communication terminals connected to the access network device through the relay terminal have left the connection state with the access network device, the access network device sends a first control message to the relay terminal.

The first control message is used for instructing the relay terminal to leave the connection state with the access network device.

In the embodiments of the present application, since the access network device controls at least one communication terminal connected to the access network device to leave the connection state with the access network device, and the access network device also records the communication terminal connected to the network access device through the relay terminal, if for one relay terminal, all communication terminals connected with the access network device leave the connection state with the access network device through the relay terminal, it means that the relay terminal does not need to maintain the connection state with the access network device, then the access network device sends a first control message to the relay terminal to control the relay terminal to leave the connection state with the access network device.

In 503, the relay terminal receives the first control message sent by the access network device.

In 504, based on the first control message, the relay terminal leaves the connection state with the access network device.

After receiving the first control message sent by the access network device, the relay terminal determines that all communication terminals connected to the access network device through the relay terminal have left the connection state with the access network device. Thus, the terminal leaves the connection state with the access network device based on the received first control message.

In some embodiments, the relay terminal leaving the connection state with the access network device includes two situations.

The first situation is that the relay terminal enters the CM-idle state and/or the Radio Resource Control (RRC)-idle state.

The first control message sent by the access network device to the relay terminal is the first wireless connection releasing message, and the relay terminal will enter the CM-idle state and/or the RRC-idle state after receiving the first wireless connection releasing message.

In some embodiments, after receiving the first wireless connection releasing message, the relay terminal may perform a state transition operation based on the first wireless connection releasing message, and the state transition operation performed includes three cases:

(1) the relay terminal enters the CM-idle state;
(2) the relay terminal enters the RRC-idle state;

(3) the relay terminal enters the CM-idle state and the RRC-idle state.

After the relay terminal receives the first wireless connection releasing message, the relay terminal enters the CM-idle state and the RRC-idle state at the same time. Or, after the relay terminal receives the first wireless connection releasing message, the relay terminal first enters the RRC-idle state, and then transitions to the CM-idle state based on the RRC-idle state.

In other embodiments, the access network device not only sends the first wireless connection releasing message to the relay terminal, but also sends a context release message to the core network to which the relay terminal is connected.

The context release message is used for instructing the core network to which the relay terminal is connected to release the context information of the relay terminal. The context information of the relay terminal is used for data exchange between the relay terminal and the core network to which the relay terminal is connected.

Since the access network device controls the relay terminal to release the wireless connection of the relay terminal, and controls the relay terminal to enter the CM-idle state and/or the RRC-idle state, at this time, the relay terminal does not need to communicate with the core network to which the relay terminal belongs. At this time, the access network device sends a context release message to the core network connected to the relay terminal, and the core network connected to the relay terminal releases the context information of the relay terminal based on the context release message.

In some embodiments, when the access network device sends a second wireless connection releasing message to at least one communication terminal, or when the access network device sends a second wireless connection suspension message to at least one communication terminal, the access network device performs the step of sending the first wireless connection releasing message to the relay terminal.

Figure 6:
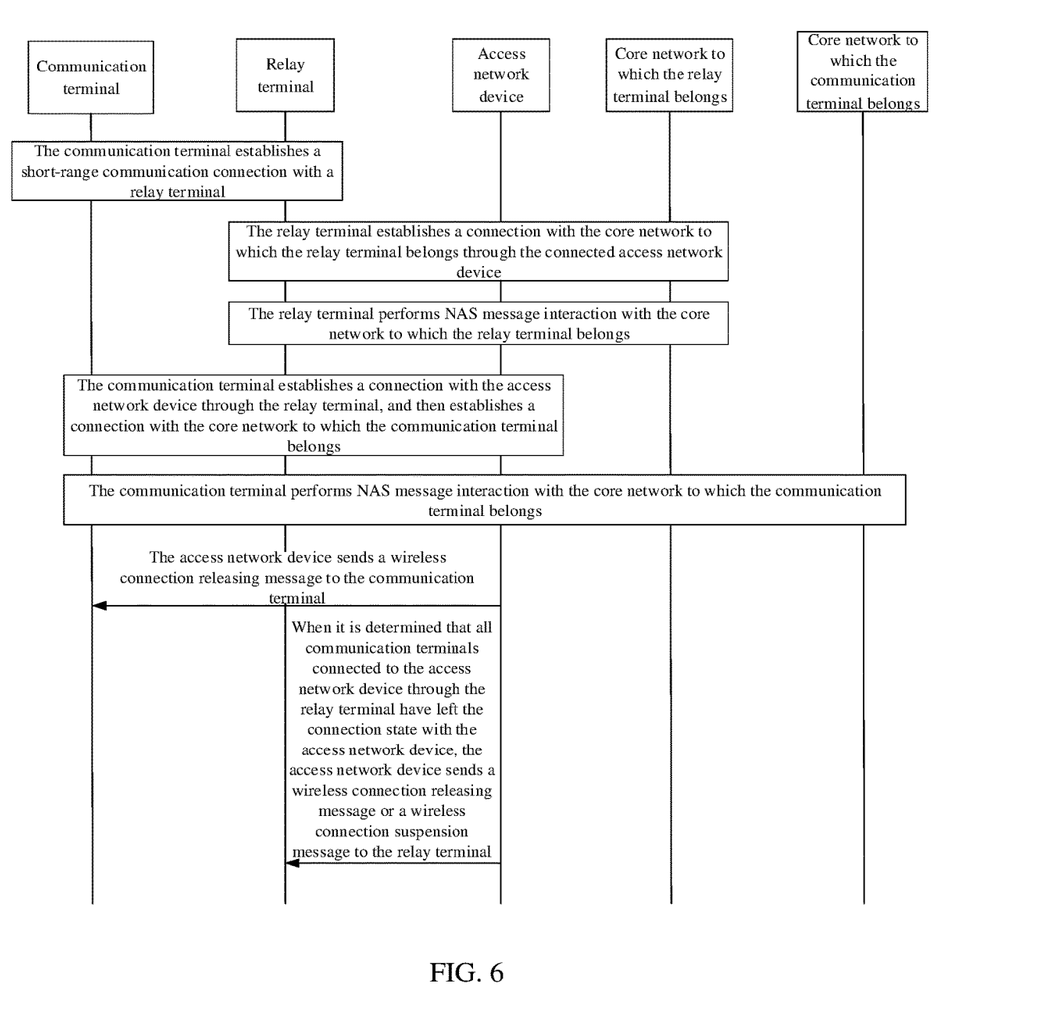
FIG. 6 shows a flowchart of a state transition method provided by an exemplary embodiment of the present application.

For example, FIG. 6 shows a flowchart of a state transition method provided by an exemplary embodiment of the present application. As shown in FIG. 6, a communication terminal establishes a short-range communication connection with a relay terminal, and the relay terminal establishes a connection with the core network to which the relay terminal belongs through the connected access network device, and then performs NAS message interaction with the core network to which the relay terminal belongs. The communication terminal establishes a connection with the access network device through the relay terminal, and then establishes a connection with the core network to which the communication terminal belongs, and performs NAS message interaction with the core network to which the communication terminal belongs. The access network device sends a wireless connection releasing message to the communication terminal. When it is determined that all communication terminals connected to the access network device through the relay terminal have left the connection state with the access network device, the access network device sends a wireless connection releasing message or a wireless connection suspension message to the relay terminal.

The second situation is that the relay terminal enters a radio resource control inactive state.

The first control message sent by the access network device to the relay terminal is the first wireless connection suspension message, and the relay terminal will enter the radio resource control inactive state after receiving the first wireless connection suspension message. In addition, the relay terminal transitions to the radio resource control inactive state of the CM-connected state at this time.

In some embodiments, when the access network device sends the second wireless connection suspension message to at least one communication terminal, the access network device performs the step of sending the first wireless connection suspension message to the relay terminal.

In other embodiments, in the case that the access network device sends the second wireless connection suspension message to some of a plurality of communication terminals, and sends the second wireless connection releasing message to other communication terminals among the plurality of communication terminals, the access network device performs the step of sending the first wireless connection suspension message to the relay terminal.

Figure 7:
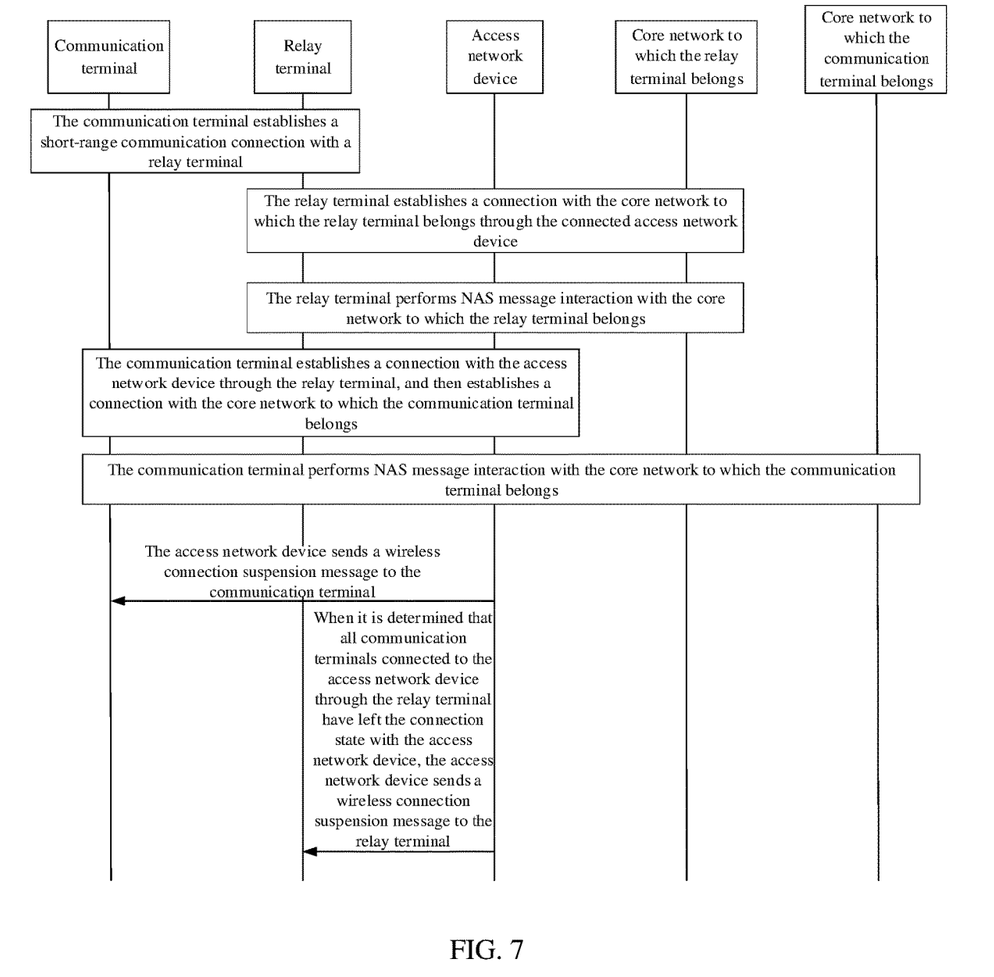
FIG. 7 shows a flowchart of a state transition method provided by an exemplary embodiment of the present application.

For example, FIG. 7 shows a flowchart of a state transition method provided by an exemplary embodiment of the present application. As shown in FIG. 7, a communication terminal establishes a short-range communication connection with a relay terminal, and the relay terminal establishes a connection with the core network to which the relay terminal belongs through the connected access network device, and then performs NAS message interaction with the core network to which the relay terminal belongs. The communication terminal establishes a connection with the access network device through the relay terminal, and then establishes a connection with the core network to which the communication terminal belongs, and performs NAS message interaction with the core network to which the communication terminal belongs. The access network device sends a wireless connection suspension message to the communication terminal, and when it is determined that all communication terminals connected to the access network device through the relay terminal have left the connection state with the access network device, the access network device sends the wireless connection suspension message to the relay terminal.

The embodiment in FIG. 6 and the embodiment in FIG. 7 are only exemplary descriptions of the present application, and the processes of establishing a connection between the communication terminal and the access network device through the relay terminal in FIG. 6 and FIG. 7 are only exemplary descriptions, not limiting that steps 501-504 in the present application must be performed on the basis of the process of establishing a connection between the communication terminal and the access network device through the relay terminal.

The second point that needs to be explained is that the embodiments of the present application are only described by taking the access network device determining that all communication terminals connected to the access network device through the relay terminal leave the connection state with the access network device as an example. In another embodiment, the access network device not only determines that all communication terminals connected to the access network device through the relay terminal leave the connection state with the access network device, but also determines that there is no service transmission of the relay terminal itself with the connected core network, and then the access network device sends the first control information to the relay terminal, so that the relay terminal leaves the connection state with the access network device, which improves the accuracy of the relay terminal leaving the connection state with the access network device.

The third point that needs to be explained is that the embodiments of the present application only take the relay terminal leaving the connection state with the access network device as an example for description. In another embodiment, if the relay terminal needs service transmission, the relay terminal switches to the CM-connected state, and at this time, it can continue to perform data transmission with the core network to which the relay terminal belongs.

In the method provided by the embodiments of the present application, when the access network device determines that all communication terminals connected to the access network device through the relay terminal have left the connection state with the access network device, it means that the relay terminal does not need to be in the connection state with the access network device any longer, the access network device controls the relay terminal to leave the connection state with the access network device, so as to prevent the situation that the relay terminal is still in the connection state with the access network device to continue to consume resources, thereby saving the resource consumption of the relay terminal, and improving the communication quality of the relay terminal.

Figure 8:
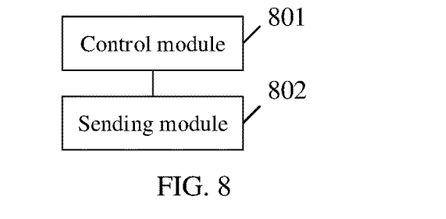
FIG. 8 shows a block diagram of a state transition apparatus provided by an exemplary embodiment of the present application.

FIG. 8 shows a block diagram of a state transition apparatus provided by an exemplary embodiment of the present application, which is applied to an access network device, where a relay terminal is connected to the access network device, the relay terminal is connected to at least one communication terminal, and the communication terminal is connected to the access network device through the relay terminal, and the apparatus includes:

a control module 801, configured to control at least one communication terminal to leave a connection state with the access network device;

a sending module 802, configured to send a first control message to the relay terminal when it is determined that all communication terminals connected to the access network device through the relay terminal have left the connection state with the access network device, where the first control message is used for instructing the relay terminal to leave the connection state with the access network device.

In some embodiments, the relay terminal leaving the connection state with the access network device includes the relay terminal entering the connection management idle (CM-idle) state and/or the radio resource control idle (RRC-idle) state, and the first control message is a first wireless connection releasing message, and the first wireless connection releasing message is used for instructing the relay terminal to transition to the CM-idle state and/or the RRC-idle state.

In some embodiments, the sending module 802 is further configured to send a context release message to the core network connected to the relay terminal, where the context release message is used for instructing the core network connected to the relay terminal to release the context information of the relay terminal.

In some embodiments, the relay terminal leaving connection state with the access network device includes the relay terminal entering the radio resource control inactive state, the first control message is a first wireless connection suspension message, and the first wireless connection suspension message is used for instructing the relay terminal to switch to the RRC inactive state.

In some embodiments, the control module 801 is configured to send a second wireless connection releasing message to at least one communication terminal, where the second wireless connection releasing message is used for instructing the communication terminal to transition to the CM-idle state.

In some embodiments, the control module 801 is configured to send a second wireless connection suspension message to at least one communication terminal, where the second wireless connection suspension message is used for instructing the communication terminal to switch to a radio resource control inactive state.

Figure 9:
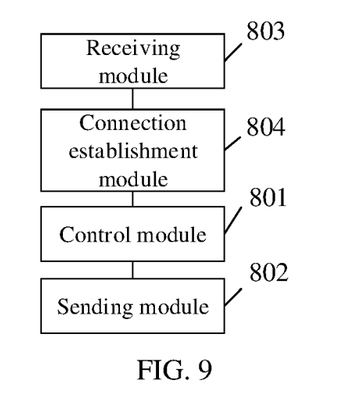
FIG. 9 shows a block diagram of a state transition apparatus provided by another exemplary embodiment of the present application.

In some embodiments, referring to FIG. 9, the apparatus further includes:

a receiving module 803, configured to receive a connection establishment request sent by the relay terminal;

a connection establishment module 804, configured to establish a wireless connection with the relay terminal.

Figure 10:
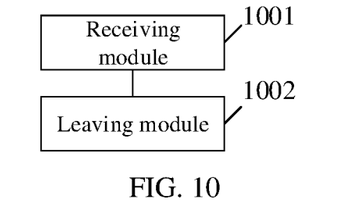
FIG. 10 shows a block diagram of a state transition apparatus provided by an exemplary embodiment of the present application.

FIG. 10 shows a block diagram of a state transition apparatus provided by an exemplary embodiment of the present application, which is applied to a relay terminal. The relay terminal is connected to an access network device, and the relay terminal is connected to at least one communication terminal, and the communication terminal is connected to the access network device through the relay terminal. The apparatus includes:

a receiving module 1001, configured to receive a first control message sent by the access network device, where the first control message is sent by the access network device when it is determined that all communication terminals connected to the access network device through the relay terminal leave the communication terminal with the access network device;

a leaving module 1002, configured to leave the connection state with the access network device based on the first control message.

In some embodiments, leaving the connection state with the access network device includes entering the CM-idle state and/or the RRC-idle state, the first control message is a first wireless connection releasing message, and the first wireless connection releasing message is used for instructing the relay terminal to transition to the CM-idle state and/or the RRC-idle state.

In some embodiments, leaving the connection state with the access network device includes entering the radio resource control inactive state, the first control message is a first wireless connection suspension message, and the first wireless connection suspension message is used for instructing the relay terminal to transition to the radio resource control inactive state.

Figure 11:
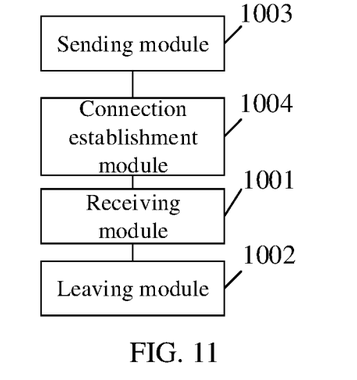
FIG. 11 shows a block diagram of a state transition apparatus provided by another exemplary embodiment of the present application.

In some embodiments, referring to FIG. 11, the apparatus further includes:

a sending module 1003, configured to send a connection establishment request to the access network device through the wireless connection with the communication terminal;

a connection establishment module 1004, configured to establish a wireless connection with the access network device.

Figure 12:
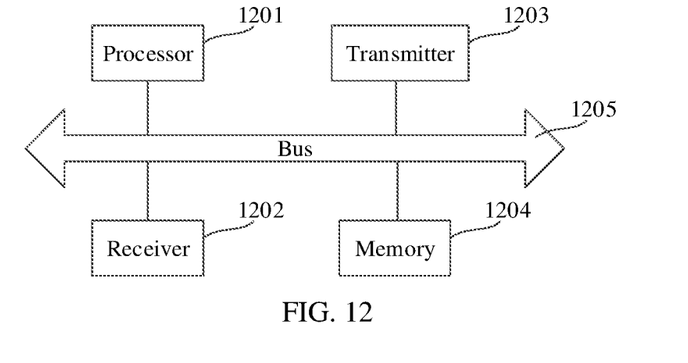
FIG. 12 shows a schematic structural diagram of a communication device provided by an exemplary embodiment of the present application.

FIG. 12 shows a schematic structural diagram of a communication device provided by an exemplary embodiment of the present application. The communication device includes: a processor 1201, a receiver 1202, a transmitter 1203, a memory 1204, and a bus 1205.

The processor 1201 includes one or more processing cores, and the processor 1201 executes various functional applications and information processing by running software programs and modules.

The receiver 1202 and the transmitter 1203 may be implemented as one communication component, which may be a communication chip.

The memory 1204 is connected to the processor 1201 through the bus 1205.

The memory 1204 may be configured to store at least one instruction, and the processor 1201 may be configured to execute the at least one instruction to implement various steps in the above method embodiments.

The communication device is an access network device or a relay terminal.

Additionally, the memory 1204 may be implemented by any type or combination of volatile or non-volatile storage devices including, but not limited to, a magnetic or optical disk, an electrically erasable and programmable Read Only Memory (EEPROM), an Erasable Programmable Read Only Memory (EPROM), a Static Random Access Memory (SRAM), a Read Only Memory (ROM), a Magnetic Memory, a Flash Memory, a Programmable Read Only Memory (PROM).

In an exemplary embodiment, a computer-readable storage medium is also provided, in which an executable program code is stored, and the executable program code is loaded and executed by the processor to implement the above state transition methods performed by the communication device provided by the above-mentioned method embodiments.

In an exemplary embodiment, a chip is also provided, the chip includes programmable logic circuits and/or program instructions, and when the chip runs on an access network device or a relay terminal, it is configured to implement the above state transition methods.

In an exemplary embodiment, a computer program product is also provided, which is used to implement the above state transition methods when the computer program product is executed by a processor of an access network device or a relay terminal.

Those of ordinary skill in the art can understand that all or part of the steps of implementing the above embodiments can be completed by hardware, or can be completed by instructing relevant hardware through a program, and the program can be stored in a computer-readable storage medium. The storage medium mentioned may be a read-only memory, a magnetic disk or an optical disk, etc.

The above descriptions are only optional embodiments of the present application, and are not intended to limit the present application. Any modifications, equivalent replacements, improvements, etc. made within the spirit and principles of the present application shall be included in the protection scope of the present application.

What is claimed is:

1. A method of state transition of an access network device, comprising:
controlling at least one communication terminal connected to the access network device through a relay terminal to leave a connection state with the access network device; and
in a case of determining that all communication terminals connected to the access network device through the relay terminal have left the connection state with the access network device, sending a first control message to the relay terminal,
wherein the first control message is used for instructing the relay terminal to leave a connection state with the access network device,
wherein the controlling the at least one communication terminal to leave the connection state with the access network device comprises:
sending a second wireless connection releasing message to the at least one communication terminal, the second wireless connection releasing message being used for instructing the communication terminal to transition to a connection management idle (CM-idle) state, or
sending a second wireless connection suspension message to the at least one communication terminal, the second wireless connection suspension message being used for instructing the communication terminal to transition to a radio resource control inactive state.

2. The method of claim 1, wherein the first control message is a first wireless connection releasing message, and the first wireless connection releasing message is used for instructing the relay terminal to transition to a connection management idle (CM-idle) state or a radio resource control idle (RRC-idle) state.

3. The method of claim 2, further comprising:
sending a context release message to a core network to which the relay terminal is connected, the context release message being used for instructing the core network to which the relay terminal is connected to release context information of the relay terminal.

4. The method of claim 1, wherein the first control message is a first wireless connection suspension message, and the first wireless connection suspension message is used for instructing the relay terminal to transition to a radio resource control inactive state.

5. The method of claim 1, further comprising:
receiving a connection establishment request sent by the relay terminal; and
establishing a wireless connection with the relay terminal.

6. An apparatus for state transition of an access network device, comprising:
a processor; and
memory storing instructions, which when executed by the processor, cause the processor to:
control at least one communication terminal to leave a connection state with the access network device; and
in a case of determining that all communication terminals connected to the access network device through a relay terminal have left the connection state with the access network device, send a first control message to the relay terminal,
wherein the first control message is used for instructing the relay terminal to leave a connection state with the access network device,
wherein the memory storing instructions, which when executed by the processor, further cause the processor to:
send a second wireless connection releasing message to the at least one communication terminal, the second wireless connection releasing message being used for instructing the communication terminal to transition to a connection management idle (CM-idle) state, or
send a second wireless connection suspension message to the at least one communication terminal, and the second wireless connection suspension message is used for instructing the communication terminal to transition to a radio resource control inactive state.

7. The apparatus of claim 6, wherein the first control message is a first wireless connection releasing message, and the first wireless connection releasing message is used for instructing the relay terminal to transition to a connection management idle (CM-idle) state or a radio resource control idle (RRC-idle) state.

8. The apparatus of claim 7, wherein the memory storing instructions, which when executed by the processor, further cause the processor to:
send a context release message to a core network to which the relay terminal is connected, the context release message being used for instructing the core network to which the relay terminal is connected to release context information of the relay terminal.

9. The apparatus of claim 6, the first control message is a first wireless connection suspension message, and the first wireless connection suspension message is used for instructing the relay terminal to transition to a radio resource control inactive state.

10. The apparatus of claim 6, wherein the memory storing instructions, which when executed by the processor, further causes the processor to:
receive a connection establishment request sent by the relay terminal; and
establish a wireless connection with the relay terminal.

11. An apparatus for state transition of a relay terminal, comprising:
a processor; and
memory storing instructions, which when executed by the processor, cause the processor to:
receive a first control message sent by an access network device, the first control message being sent by the access network device in a case of determining that all communication terminals connected to the access network device through the relay terminal have left a connection state with the access network device; and
leave a connection state with the access network device based on the first control message,
wherein the access network device controls at least one communication terminal to leave the connection state with the access network device by sending a second wireless connection release message to the at least one communication terminal to instruct the communication terminal to transition to a connection management idle (CM-idle) state, or by sending a second wireless connection suspension message to the at least one communication terminal to instruct the communication terminal to transition to a radio resource control inactive state.

12. The apparatus of claim 11, wherein, to leave the connection state with the access network device, the memory storing instructions, which when executed by the processor, cause the processor to:
enter a connection management idle (CM-idle) state or a radio resource control idle (RRC-idle) state, the first control message being a first wireless connection releasing message, and the first wireless connection releasing message being used for instructing the relay terminal to transition to the CM-idle state or the RRC-idle state.

13. The apparatus of claim 11, wherein, to leave the connection state with the access network device, the memory storing instructions, which when executed by the processor, cause the processor to:
enter a radio resource control inactive state, the first control message being a first wireless connection suspension message, and the first wireless connection suspension message being used for instructing the relay terminal to transition to the radio resource control inactive state.

14. The apparatus of claim 11, wherein the memory storing instructions, which when executed by the processor, cause the processor to:
send a connection establishment request to the access network device through a wireless connection with the communication terminal; and
establish a wireless connection with the access network device.

* * * * *